(12) United States Patent
McCauley et al.

(10) Patent No.: US 7,327,285 B2
(45) Date of Patent: Feb. 5, 2008

(54) SYSTEM AND METHOD FOR ELIMINATING TERRAIN COLOR CONFUSION IN AIRCRAFT DISPLAYS

(75) Inventors: Stephen G. McCauley, Peoria, AZ (US); Aaron J. Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 276 days.

(21) Appl. No.: 11/089,728

(22) Filed: Mar. 25, 2005

(65) Prior Publication Data

US 2006/0220920 A1 Oct. 5, 2006

(51) Int. Cl.
*G08B 23/00* (2006.01)

(52) U.S. Cl. .................. 340/963; 340/970; 342/26 B; 342/179; 701/9; 701/301

(58) Field of Classification Search ............... 340/970, 340/961, 963, 968; 342/26, 65, 29, 176, 342/179, 26 B; 701/9, 14, 4, 8, 301, 120, 701/207, 213, 219
See application file for complete search history.

(56) References Cited

U.S. PATENT DOCUMENTS

| | | | | |
|---|---|---|---|---|
| 5,828,332 A | * | 10/1998 | Frederick | 342/26 B |
| 5,936,552 A | | 8/1999 | Wichgers et al. | |
| 5,945,926 A | * | 8/1999 | Ammar et al. | 340/970 |
| 6,122,570 A | * | 9/2000 | Muller et al. | 701/9 |
| 6,653,947 B2 | | 11/2003 | Dwyer et al. | |
| 6,980,224 B2 | * | 12/2005 | Wiant, Jr. | 345/629 |
| 2004/0160341 A1 | | 8/2004 | Feyereisen et al. | |

* cited by examiner

*Primary Examiner*—Anh V. La
(74) *Attorney, Agent, or Firm*—Fogg & Powers LLC

(57) ABSTRACT

An improved system and method for eliminating terrain color confusion in aircraft displays are disclosed. An aircraft display system is described that includes a database for storing terrain data, a processing unit, an altitude determination unit, and a visual display. As the aircraft proceeds along a flight path, the processing unit determines the aircraft's current position and compares associated terrain elevation data stored in the database with altitude data received from the altitude determination unit. For example, if the processing unit's comparison of the stored terrain data and altitude data indicates that relative terrain data need not be displayed, then the processing unit provides absolute terrain color renderings to the display. However, if the processing unit's comparison of the stored terrain data and altitude data indicates that relative terrain data should be displayed, then the processing unit removes the hue from the absolute terrain color renderings on the display and replaces the color, for example, with a grayscale. Therefore, by removing color from an absolute terrain layer if relative terrain color information is displayed, the present invention eliminates terrain color confusion between the absolute and relative terrain data shown on an aircraft's display.

20 Claims, 5 Drawing Sheets

SYSTEM AND METHOD FOR ELIMINATING TERRAIN COLOR CONFUSION IN AIRCRAFT DISPLAYS

FIELD OF THE INVENTION

The invention relates generally to the field of display systems, and more specifically, but not exclusively, to a system and method for eliminating terrain color confusion in aircraft displays.

BACKGROUND OF THE INVENTION

Modern aircraft contain visual display systems that provide pilots with real-time terrain and weather information. In particular, visual display systems that provide dynamic, real-time terrain situational information including hazard awareness and avoidance information are well known. A typical aircraft cockpit display shows terrain data and potential hazards in a horizontal terrain elevation view or profile terrain elevation view relative to that aircraft's position, altitude and heading. For example, a terrain situation awareness display that illustrates a horizontal or plan terrain elevation view (i.e., "birds eye" or map view) and a profile terrain elevation view, is disclosed in U.S. Pat. No. 5,936,552 to Winchers, et al., which is incorporated herein by reference in its entirety.

However, a significant drawback of these earlier terrain situation awareness display systems is that they provide detailed terrain elevation information only for terrain elevations above a pre-selected "comfort zone". Except for color coding large bodies of water and certain non-dynamic information (e.g., restricted air space, airport locations) on the display, these earlier systems eliminate terrain details below the elevation of the pre-selected "comfort zone". Consequently, these earlier terrain situation awareness display systems are limited to the display of tactical information to which a pilot reacts in the short term.

Limitations of the earlier terrain situation awareness display systems have been overcome by a method for dynamically displaying terrain situation awareness information disclosed in commonly assigned U.S. Patent Application Publication No. U.S. 2004/0160341 A1 to Feyereisen et al. ("Feyereisen"), which is incorporated herein by reference in its entirety. In Feyereisen, an integrated display apparatus dynamically displays terrain situation awareness information over a selected distance relative to an aircraft's current position and altitude. The apparatus displays a color coded representation of a strategic portion of the terrain elevation data having an elevation less than a pre-selected strategic altitude threshold determined relative to and less than the current altitude data. The color coded representation of strategic terrain elevation data includes a monochromatic scale graduated as a function of terrain elevation relative to mean sea level. The apparatus also displays a color coded representation of a tactical portion of the terrain elevation data having an elevation greater than the pre-selected strategic altitude threshold. The color coded representation of a tactical portion of the terrain elevation data includes color coding as a function of terrain elevation relative to the altitude above ground data. As such, different colors are used to represent different tactical portions of the terrain elevation data. For example, one color (e.g., green) represents a safe portion of the tactical terrain elevation data having an elevation between the strategic altitude threshold and a pre-selected caution elevation below the altitude above ground data, a second color (e.g., yellow) represents a caution portion of the tactical terrain elevation data having an elevation between the caution elevation and the altitude above ground data, and a third color (e.g., red) represents a warning portion of the tactical terrain elevation data having an elevation greater than the altitude above ground data.

Existing aircraft display systems are capable of simultaneously displaying different color sets (e.g., safe/caution/warning) for absolute (relative to mean sea level) terrain elevation data and aircraft-relative (e.g., Enhanced Ground Proximity) terrain elevation data. For example, the color set displayed for absolute terrain elevation data is typically green/tan/brown, and the safe/caution/warning color set displayed for aircraft-relative terrain elevation data is typically green/yellow/red. However, a significant problem that arises with the simultaneous display of different color sets for absolute and aircraft-relative terrain elevation data is that pilots often become confused by the different color sets used, and in particular, by the similar colors used especially in the green and yellow/tan terrain elevation data color bands. Therefore, it would be advantageous to have a system and method that can eliminate color confusion between absolute terrain and relative terrain in aircraft displays. As described in detail below, the present invention provides such a system and method, which resolve the terrain color confusion problems encountered by pilots with existing aircraft displays and other prior art aircraft displays.

SUMMARY OF THE INVENTION

The present invention provides an improved system and method for eliminating terrain color confusion in aircraft displays. In accordance with a preferred embodiment of the present invention, an aircraft display system is provided that includes a database for storing terrain data, a processing unit, an altitude determination unit, and a visual display. As the aircraft proceeds along a flight path, the processing unit determines the aircraft's current position and compares associated terrain elevation data stored in the database with aircraft altitude data received from the altitude determination unit. For this example embodiment, if the processing unit's comparison of the stored terrain data and altitude data indicates that relative terrain data need not be displayed, then the processing unit provides absolute terrain color renderings to the display. However, if the processing unit's comparison of the stored terrain data and altitude data indicates that relative terrain data should be displayed, then the processing unit removes the hue from the absolute terrain color renderings on the display and replaces the color, for example, with a grayscale. Therefore, by removing color from an absolute terrain layer if relative terrain color information is displayed, the present invention eliminates terrain color confusion between the absolute and relative terrain data shown on an aircraft's display.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
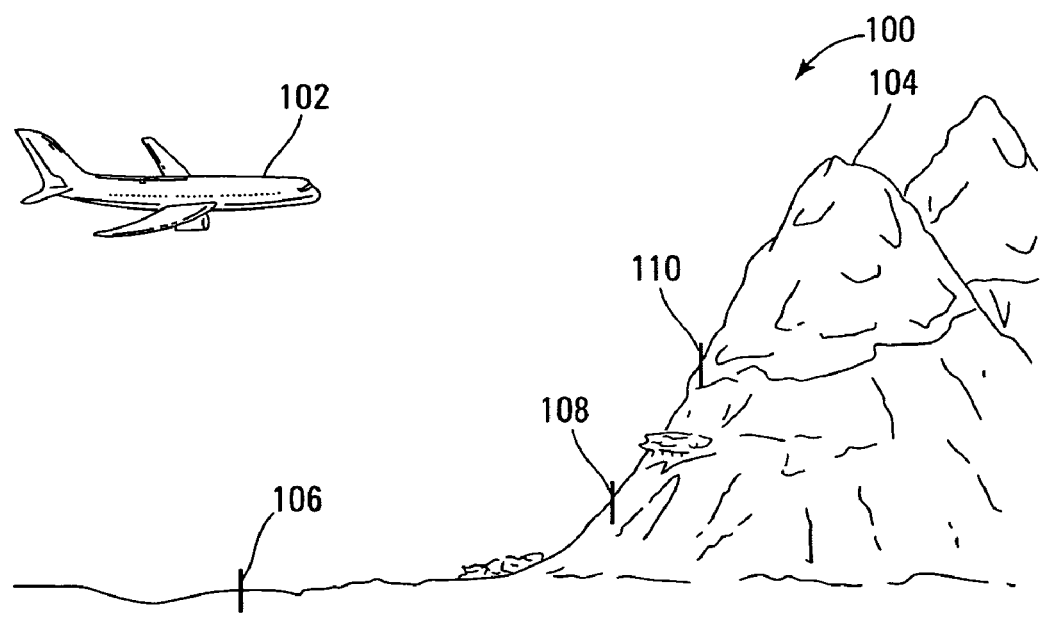
FIG. 1 depicts a pictorial representation of an example aircraft flight environment, which can be used to illustrate one or more embodiments of the present invention.

With reference now to the figures, FIG. 1 depicts a pictorial representation of an example aircraft flight environment 100, which can be used to illustrate one or more embodiments of the present invention. For this illustrative example, flight environment 100 depicts an airborne aircraft 102 approaching elevated terrain 104. For simplicity, only three example elevations 106, 108 and 110 associated with aircraft 102 and elevated terrain 104 are shown. Although elevated terrain 104 is shown in FIG. 1 as a hilly or mountainous type of terrain, this depiction is for illustrative purposes only and is not intended to limit the scope of the present invention. For example, aircraft 102 could also be approaching other elevated objects such as buildings, radio antenna towers, etc. In other words, aircraft 102 may be approaching one or more elevated obstacles that the pilot should be aware of and/or want to avoid.

Figure 2:
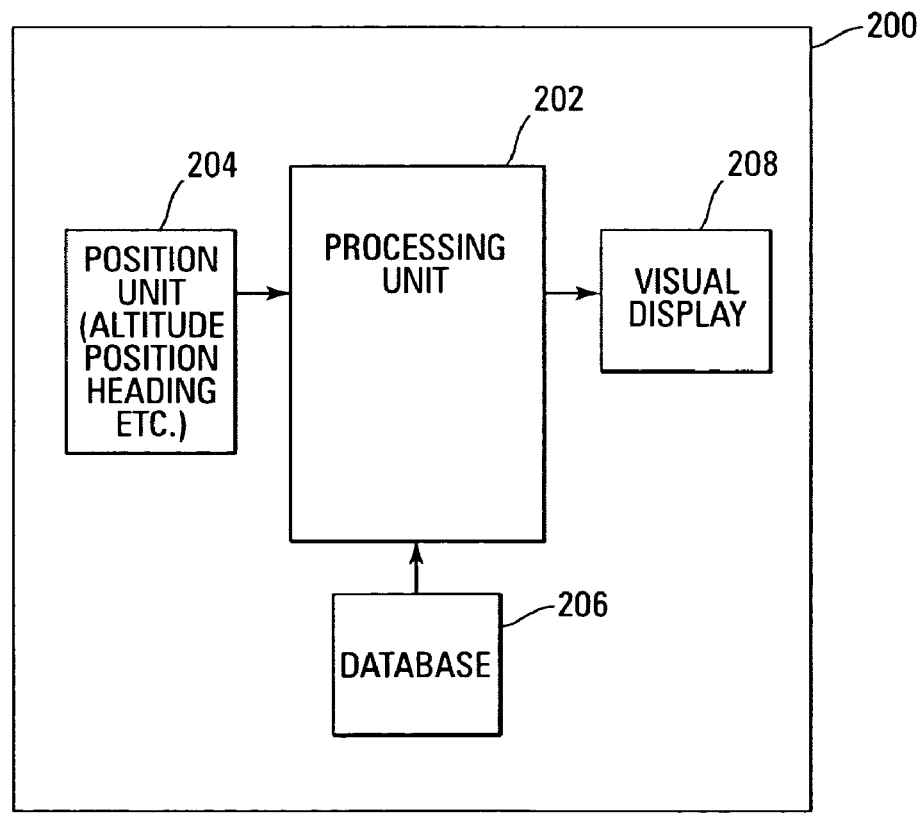
FIG. 2 depicts a block diagram of an example system for eliminating terrain color confusion in an aircraft display, which can be used to implement a preferred embodiment of the present invention.

FIG. 2 depicts a block diagram of an example system 200 for eliminating terrain color confusion in an aircraft display, which can be used to implement a preferred embodiment of the present invention. For this example embodiment, system 200 includes a processing unit 202, a position determination unit 204, a database 206, and a visual display 208. Notably, it should be understood that although system 200 appears in FIG. 2 to be arranged as an integrated system, the present invention is not intended to be so limited and can also include an arrangement whereby one or more of processing unit 202, position determination unit 204, database 206 and visual display 208 is a separate component or a subcomponent of another system located either onboard or external to aircraft 102. Also, for example, system 200 can be arranged as an integrated system (e.g., aircraft display system, etc.) or a subsystem of a more comprehensive aircraft system (e.g., navigational system, terrain awareness/avoidance system, etc.).

For this embodiment, processing unit 202 can be a computer processor such as, for example, a microprocessor, digital signal processor, or any suitable processor capable of at least receiving and/or retrieving aircraft position data (including altitude data) and terrain data, comparing altitude data with terrain data, generating display control signals for a visual display responsive to the comparison, and sending the generated display control signals to a visual display (e.g., visual display 208 in FIG. 2). For example, processing unit 202 can be arranged as a single processor or plurality of processors connected to a data communications bus or system bus. A memory controller/cache can also be connected to the data communications bus or system bus, which can provide an interface between processing unit 202 and a local memory (e.g., RAM, ROM, etc.). A plurality of machine instructions can be stored in the local memory and retrieved and operated on by processing unit 202 to generate the control signals for the visual display. An Input/Output (I/O) bus bridge can also be connected to the data communications bus or system bus, which can provide an interface between processing unit 202 and an I/O bus. Thus, processing unit 202 can receive, retrieve and/or send data via such an I/O bus. In any event, those of ordinary skill in the art will appreciate that the hardware described herein for processing unit 202 in FIG. 2 may vary. As such, the depicted example is provided for illustrative purposes and not meant to imply architectural limitations with respect to the present invention.

For this embodiment, system 200 also includes a position determination unit 204 coupled to processing unit 202 (e.g., via an I/O bus connection). For example, position determination unit 204 can provide current navigation data about the aircraft's altitude, course, heading, track, and latitude and longitude to processing unit 202. Position determination unit 204 can obtain the navigation data from an onboard navigation system that can include, for example, an inertial navigation system, a satellite navigation system (e.g., Global Positioning System), VLF/OMEGA, Loran C, VOR/DME, DME/DME, or from a Flight Management System. The navigation system can provide information to position determination unit 204 about the aircraft's barometric altitude relative to sea level, and its vertical speed and current air speed. Alternatively, for example, position determination unit 204 can receive such navigation information from an air data computer, or a barometric altimeter and barometric rate circuit onboard the aircraft.

Position determination unit 204 can also provide to processing unit 202 the aircraft's current altitude relative to the ground (e.g., AGL). For example, the aircraft's current altitude relative to the ground can be provided to position determination unit 204 by signals from an onboard radio altimeter that measures vertical distance between the aircraft and the ground. This altitude information can also be provided by a laser altimeter. Alternatively, position determination unit 204 can obtain the aircraft's current altitude relative to the ground from an onboard Global Positioning System receiver. In any event, for this example embodiment, position determination unit 204 can include any suitable altitude determination device that is capable of providing processing unit 202 with an aircraft's current altitude relative to the ground.

System 200 also includes a database 206 coupled to processing unit 202 (e.g., via an I/O bus connection). For this example embodiment, database 206 is a memory device (e.g., non-volatile memory, disk, drive, tape, mass storage device, etc.) that can store digital terrain data as a function of aircraft position (e.g., latitudinal and longitudinal position data). A source for the digital terrain data stored in database 206 can be, for example, a United States Geological Survey (USGS) map having a resolution of approximately 90 meters, which includes topographical relief information that can be used to apply grid lines following the contour of the terrain. As such, database 206 can store a terrain database including the locations and elevations of natural terrain obstacles such as mountains or other elevated ground areas, and also the locations and elevations of man-made obstacles such as radio antenna towers, buildings, bridges, etc. The terrain database stored in database 206 can also include, for example, the boundaries of restricted airspace, restricted elevations for particular airspace, airport and air park locations, bodies of water, etc. As yet another example, the terrain database stored in database 206 can be a Jeppesen-styled database, which covers a 300 by 270 mile area of terrain and includes topographical relief information. In any event, other suitable terrain databases that can be stored in database 206 may be used, such as, for example, the terrain database associated with Honeywell International Inc.'s Enhanced Ground Proximity Warning System (EGPWS).

For this example embodiment, system 200 also includes a visual display 208 coupled to processing unit 202 (e.g., via an I/O bus connection). Using altitude data retrieved (or received) from position determination unit 204 and terrain data from database 206, processing unit 202 executes one or more algorithms for generating a plurality of display control signals. Processing unit 202 sends the plurality of display control signals to visual display 208. Preferably, for this embodiment, visual display 208 is an aircraft cockpit display. Visual display 208 interprets the received plurality of display control signals and generates suitable terrain symbology, which is presented on a screen of visual display 208. Notably, although a conventional cockpit display screen may be used to display the terrain information, the present invention is not intended to be so limited and can include any suitable type of display medium capable of visually presenting terrain information for a pilot (e.g., CRT display, LCD, OLED display, plasma display, projection display, flat panel display, heads-up display, heads-down display, etc.). For example, visual display 208 can display terrain situational awareness information for a pilot as a 3-dimensional representation of the terrain relief, similar to that disclosed in Feyereisen.

For this example embodiment, processing unit 202 can retrieve terrain information from database 206 as real-time spatial position information (e.g., position defined by latitudinal and longitudinal values). As a function of the real-time aircraft position information, processing unit 202 retrieves terrain data from database 206 relevant to a selected range within a wide-angle field of view portrayed by visual display 208. As such, visual display 208 can display terrain information projected along the current real-time heading of the aircraft, within the vertical, lateral and range extents of the displayed field of view.

Processing unit 202 can determine strategic and tactical terrain information as a function of the terrain information relevant to the aircraft's real-time spatial position, heading, altitude above ground, and a pre-selected strategic threshold altitude. The terrain below this strategic threshold altitude can be categorized, for example, as strategic terrain Processing unit 202 can color code the strategic terrain information according to a monochromatic or polychromatic scale graduated as a function of terrain elevation relative to mean sea level to develop a 3-dimensional representation of the terrain relief for visual display 208.

Processing unit 202 can categorize tactical terrain above the pre-selected strategic threshold altitude as a function of the potential hazards presented. The tactical terrain can be divided into warning, caution and safe bands as a function of the terrain elevation relative to the aircraft's current altitude above ground. For example, processing unit 202 can color code (for presentation by visual display 208) the tactical terrain information relative to the aircraft's current altitude above ground based upon the pre-selected warning, caution and safe relative elevation thresholds. Each such elevation band can be color coded on a graduated scale as a function of terrain elevation to develop a 3-dimensional representation of the terrain relief. Also, for example, portions of the display medium for visual display 208 showing tactical terrain at or above the aircraft's current altitude, can be illuminated or painted using a relative altitude color selected to indicate warning, such as red. Portions of the display showing terrain having an elevation below the current altitude of the aircraft, but above the pre-selected caution altitude, can be illuminated or painted using a relative altitude color selected to indicate caution, such as yellow. Similarly, portions of the display showing terrain having an elevation below the pre-selected caution threshold altitude relative to the aircraft's current altitude, but above a pre-selected safe threshold, can be illuminated or painted using a relative altitude color selected to indicate safety, such as green.

The strategic or absolute terrain (e.g., terrain referenced to mean sea level) can also be color coded for presentation on visual display 208. For example, portions of the display showing absolute terrain can be illuminated or painted with an absolute terrain elevation color typically used, such as brown or tan.

Figure 3A:
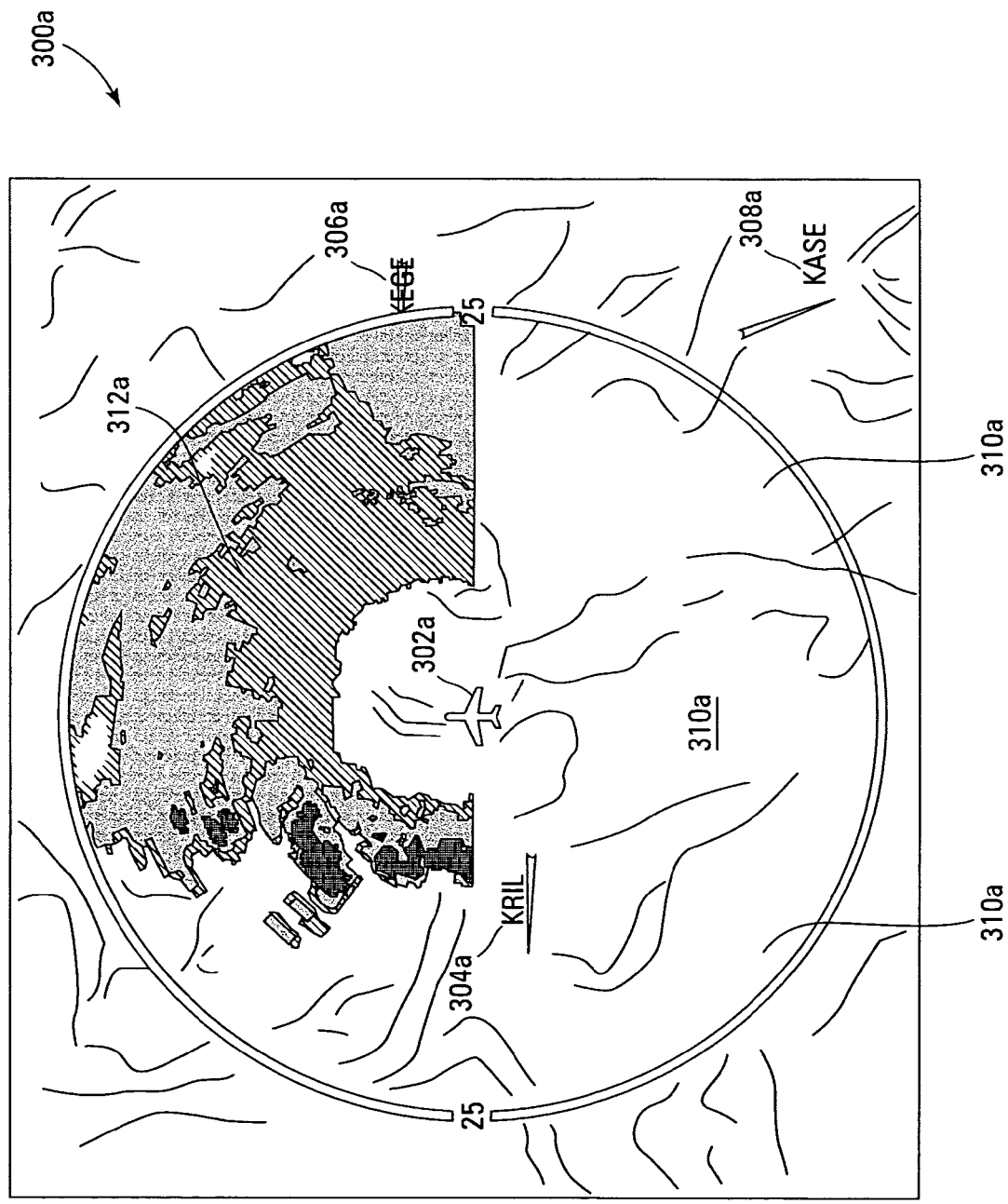
FIGS. 3A-3C are related pictorial representations depicting visual displays that illustrate one or more exemplary embodiments of the present invention.
Figure 3B:
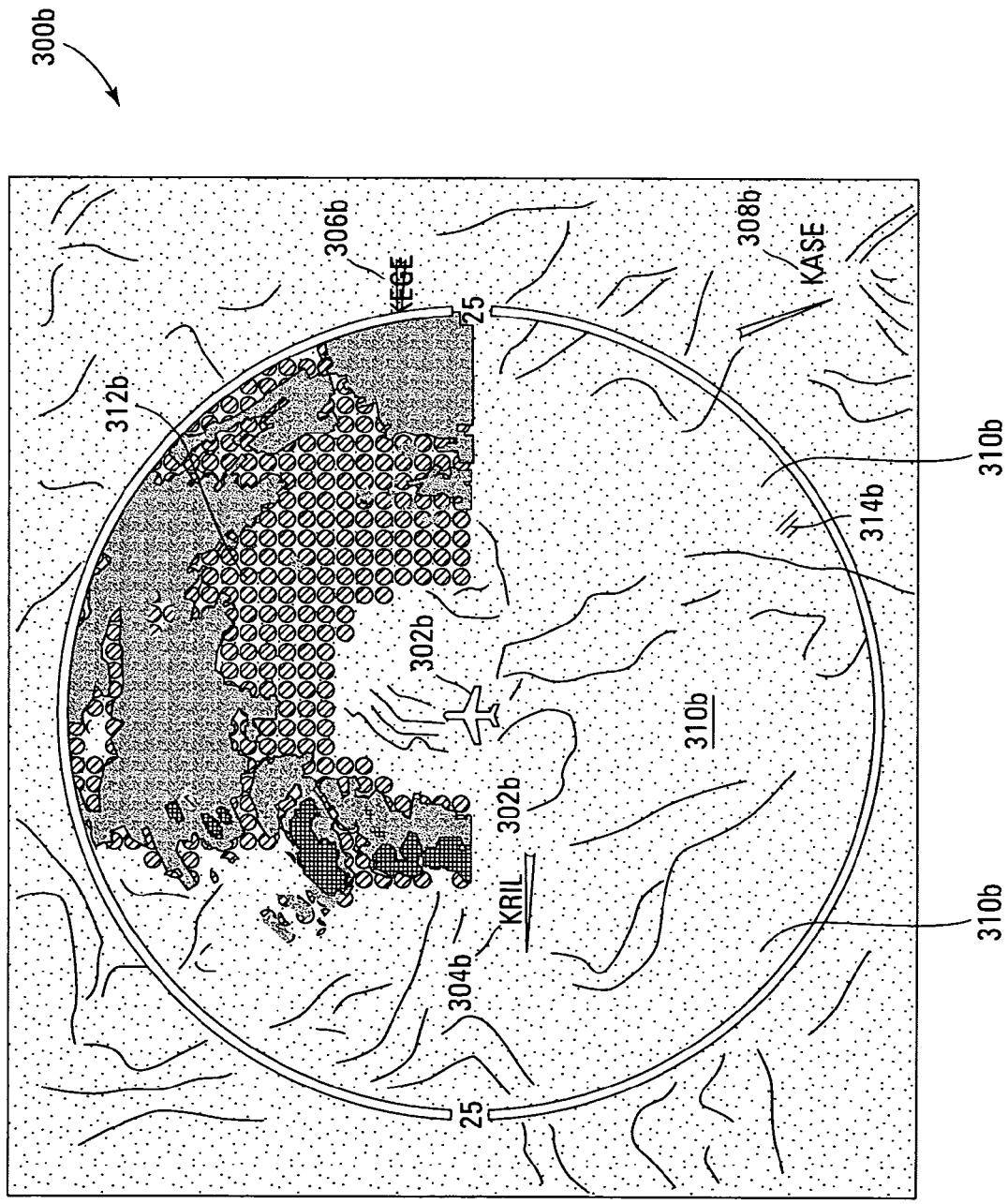
Figure 3C:
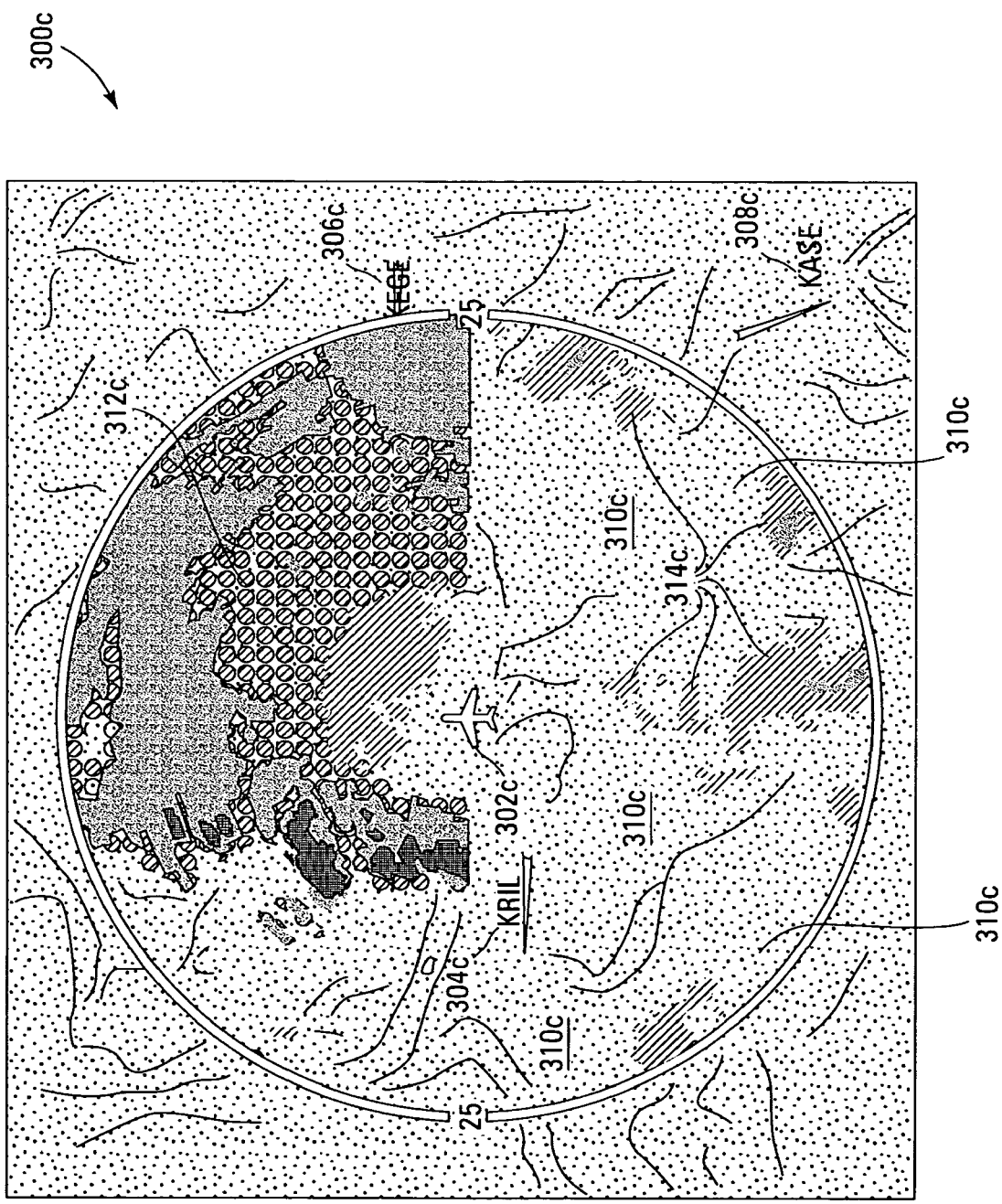

FIGS. 3A-3C are related pictorial representations depicting visual displays that illustrate one or more exemplary embodiments of the present invention. Referring to FIG. 3A, a pictorial representation of a visual display 300a (e.g., presentation for visual display 208 in FIG. 2) is shown, which includes a visual representation of an aircraft 302a, a plurality of visual representations of airports 304a, 306a, 308a, and a visual representation of absolute (e.g., relative to mean sea level) terrain elevation information (depicted generally as 310a) painted, for this illustrative example, within a circle having a 25 mile radius extending from the position of aircraft 302a. For example, FIG. 3A might represent the position of aircraft 102 in FIG. 1 directly above elevation 106, which can represent absolute terrain elevation. For this example, the areas represented as absolute terrain elevation information 310a are painted in an absolute terrain elevation color of brown. Also, for illustrative purposes, weather radar information is being painted in the upper portion of visual display 300a and depicted generally as 312a. In accordance with the principles of the present invention, no relative terrain elevation information is shown on visual display 300a. Consequently, for this embodiment, the absolute terrain elevation information 310a is painted a typical absolute terrain color of brown.

FIG. 3B shows a pictorial representation of a visual display 300b (e.g., 208 in FIG. 2), which illustrates the principles of the present invention. For example, FIG. 3B might represent the position of aircraft 102 in FIG. 1 as it approaches elevation 108, which can represent aircraft-relative terrain elevation. Also, for this example, aircraft 102 may be descending in elevation. Similar to FIG. 3A, visual display 300b includes a visual representation of an aircraft 302b, a plurality of visual representations of airports 304b, 306b, 308b, and a visual representation of absolute (e.g., relative to mean sea level) terrain elevation information (depicted generally as 310b) painted within a circle having a 25 mile radius extending from the position of aircraft 302b. Similar to the example shown in FIG. 3A, for illustrative purposes, weather radar information is being painted in the upper portion of visual display 300b and depicted generally as 312b. However, FIGS. 3A and 3B differ in that relative terrain information 314b (e.g., color coded green for safe) is now being posted in visual display 300b. Notably, in accordance with the principles of the present invention, the absolute terrain elevation information 310b in FIG. 3B is losing its brownish hue and shifting color towards a gray-scale (e.g., indicated, for illustrative purposes, by dot shading).

FIG. 3C shows a pictorial representation of a visual display 300c (e.g., 208 in FIG. 2), which further illustrates the principles of the present invention. For example, FIG. 3C might represent the position of aircraft 102 in FIG. 1 as it approaches elevation 110, which can represent aircraft-relative terrain elevation. Also, for this example, aircraft 102 may be descending further in elevation relative to that of FIG. 3B. Similar to FIG. 3B, visual display 300c includes a visual representation of an aircraft 302c, a plurality of visual representations of airports 304c, 306c, 308c, and a visual representation of absolute (e.g., relative to mean sea level) terrain elevation information (depicted generally as 310c) painted within a circle having a 25 mile radius extending from the position of aircraft 302c. Again, for this example, weather radar information is being painted in the upper portion of visual display 300c and depicted generally as 312c. However, FIGS. 3B and 3C differ in that a significant amount of additional aircraft-relative terrain information areas 314c (e.g., color coded green for safe and yellow for caution) are now being posted in visual display 300c. Notably, in accordance with the principles of the present invention, the absolute terrain elevation information 310c in FIG. 3C has now completely lost its brownish hue (e.g., shifted completely to a grayscale). For illustrative purposes, the grayscale for the absolute terrain elevation information 310c in FIG. 3C is indicated by dot shading, but this dot shading is denser than that shown for the absolute terrain elevation information 310b in FIG. 3B to distinguish the brownish hue of FIG. 3B from the grayscale of FIG. 3C.

Figure 4:
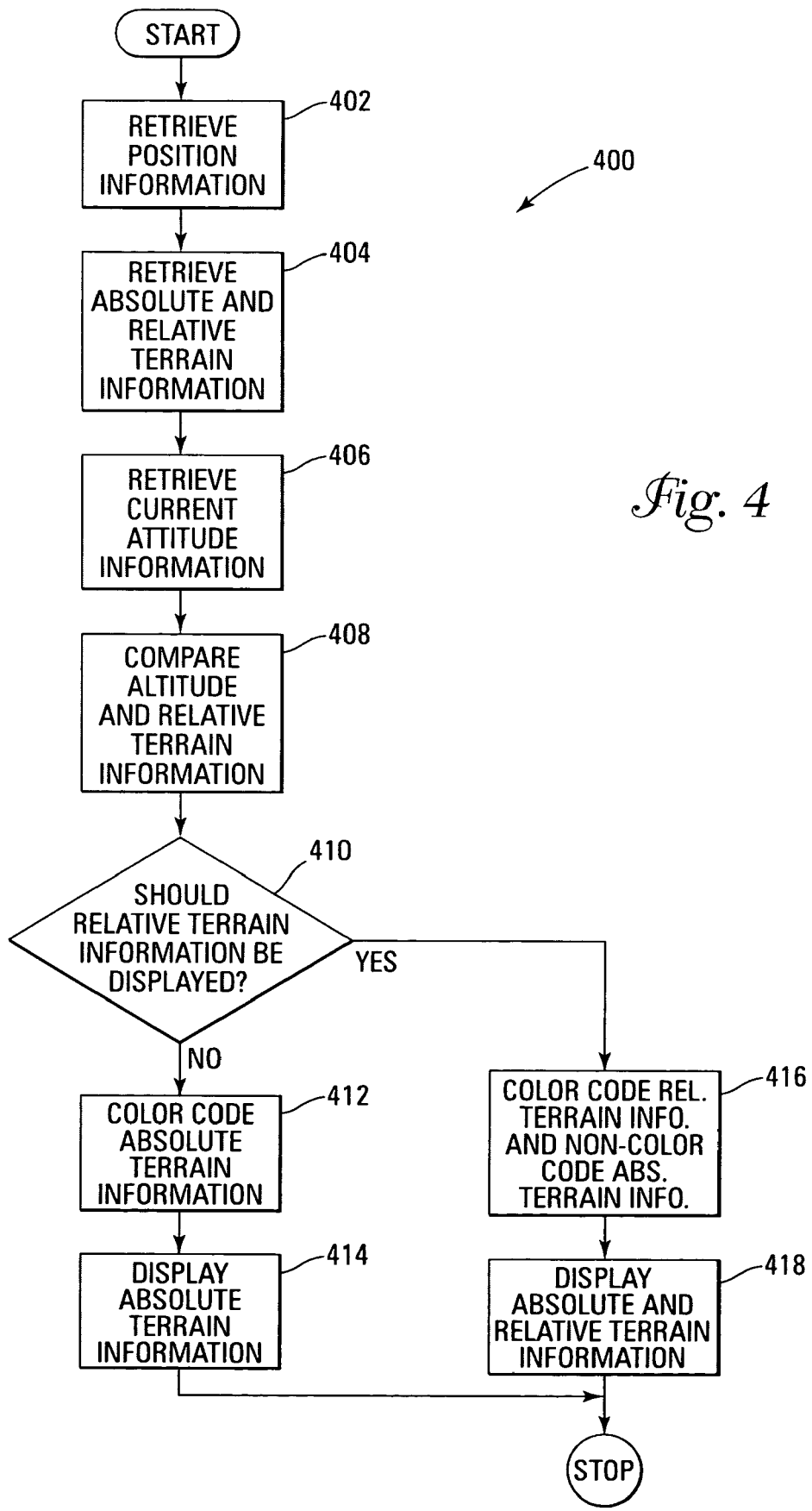
FIG. 4 depicts a flow chart showing an exemplary method for eliminating pilot confusion resulting from a simultaneous showing of different color sets for absolute terrain data and relative terrain data on an aircraft display, in accordance with the one or more embodiments illustrated by the pictorial representations shown in FIGS. 3A-3C.

FIG. 4 depicts a flow chart showing an exemplary method 400 for eliminating pilot confusion resulting from a simultaneous showing of different color sets for absolute terrain data and relative terrain data on an aircraft display, in accordance with the one or more embodiments illustrated by the pictorial representations shown in FIGS. 3A-3C. Referring to FIGS. 2 and 4, for this example, processing unit 202 retrieves aircraft position information from position determination unit 204 (step 402). Processing unit 202 then retrieves absolute terrain information and relative terrain information (e.g., associated with the aircraft's position) from database 206 (step 404). Next, processing unit 202 retrieves the aircraft's current altitude information from an altitude determination device associated with position determination unit 204 (step 406). Processing unit 202 then executes a suitable algorithm to compare the retrieved current altitude information and relative terrain information (step 408). For this example, the current altitude information represents the aircraft's elevation above ground, and the relative terrain information represents aircraft-relative terrain information. From this comparison of the aircraft's altitude and the aircraft-relative terrain information, processing unit 202 then determines whether or not the relative terrain information should be visually displayed (step 410).

If the comparison of the current altitude information and relative terrain information (step 408) indicates that the relative terrain information need not be displayed (e.g., the aircraft is not close enough to the relative terrain to be of concern to the pilot), then processing unit 202 generates visual display control signals to color code (e.g., brown) the retrieved absolute terrain information (step 412). Processing unit 202 then sends the visual display control signals for the color coded absolute terrain information to visual display 208 (step 414).

However, in accordance with the principles of the present invention, if the comparison of the current altitude information and relative terrain information (step 408) indicates that the relative terrain information should be displayed (e.g., the aircraft is close enough to the relative terrain to be of concern to the pilot), then processing unit 202 generates visual display control signals to color code (e.g., green, yellow and/or red) the retrieved aircraft-relative terrain information, but removes the hue (e.g., replaces the existing color with a grayscale) from the color of the retrieved absolute terrain information (step 416). For the purpose of clarification, but not intended as a limitation on the scope of the present invention, an operation to remove a hue from a color can also be construed as a non-color coding operation, and vice versa. In other words, a non-color coding operation or color removal operation should not be construed strictly as an operation that does not color code absolute terrain information. Also, for example, non-color coding can also be construed as an operation to reduce or lower color saturation, luminance, etc. Processing unit 202 then sends the visual display control signals for the color coded aircraft-relative terrain information and the resulting (e.g., grayscale) absolute terrain information to visual display 208 (step 418).

It is important to note that while the present invention has been described in the context of a fully functioning aircraft display system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular aircraft display system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for eliminating terrain color confusion in a visual display, comprising:
   an altitude determination unit, said altitude determination unit operable to determine a current altitude of an airborne vehicle;
   a data storage unit, said data storage unit operable to store a first plurality of absolute terrain data elements and a second plurality of relative terrain data elements; and
   a processing unit coupled to said altitude determination unit and said data storage unit, said processing unit operable to:
   receive said current altitude of said airborne vehicle from said altitude determination unit;
   retrieve said first plurality of absolute terrain data elements and said second plurality of relative terrain data elements from said data storage unit;
   compare said current altitude of said airborne vehicle with said second plurality of relative terrain data elements; and
   if said comparison of said current altitude of said airborne vehicle and said second plurality of relative terrain data elements indicates that an elevation associated with at least one relative terrain data element of said second plurality of relative terrain data elements is greater than or equal to a predefined elevation associated with said current altitude of said airborne vehicle, generate a first plurality of non-color coded visual display control signals associated with said first plurality of absolute terrain data elements such that the first plurality of non-color coded visual display control signals removes all colors or hues in a visual display of said first plurality of absolute terrain data elements, and generate a second plurality of color coded visual display control signals associated with said at least one relative terrain data element.

2. The system of claim 1, wherein said processing unit is further operable to:
generate a first plurality of color coded visual display control signals associated with said first plurality of absolute terrain data elements, if said comparison of said current altitude of said airborne vehicle and said second plurality of relative terrain data elements indicates that said elevation associated with said at least one relative terrain data element of said second plurality of relative terrain data elements is less than said predefined elevation associated with said current altitude of said airborne vehicle.

3. The system of claim 1, further comprising:
a visual display coupled to said processing unit, said visual display operable to display a visual representation of said first plurality of non-color coded visual display control signals associated with said first plurality of absolute terrain data elements and said second plurality of color coded visual display control signals associated with said at least one relative terrain data element.

4. The system of claim 1, wherein said second plurality of color coded visual display control signals includes at least one color signal representing a color of green, yellow or red.

5. The system of claim 1, wherein said first plurality of non-color coded visual display control signals includes at least one signal representing a grayscale.

6. The system of claim 1, wherein said altitude determination unit comprises an aircraft altitude sensor.

7. The system of claim 1, wherein said data storage unit comprises a terrain database.

8. An aircraft situational awareness display system, comprising:
an altitude sensing device;
a terrain database; and
a processor coupled to said altitude sensing device and said terrain database, said processor operable to:
receive a current altitude of said aircraft from said altitude sensing device;
retrieve absolute terrain data and relative terrain data from said terrain database;
compare said current altitude with said relative terrain data; and
if said comparison of said current altitude and said relative terrain data indicates that said relative terrain data should be displayed, generating non-color coded visual display control signals associated with said absolute terrain data such that said non-color coded visual display control signals remove all colors or hues in a visual display of said absolute terrain data, and generating color coded visual display control signals associated with said relative terrain data.

9. A method for eliminating terrain color confusion in a visual display, comprising the steps of:
determining a current altitude of an airborne vehicle;
retrieving a first plurality of absolute terrain data elements and a second plurality of relative terrain data elements;
comparing said current altitude of said airborne vehicle with said second plurality of relative terrain data elements; and
if a result of said comparing step indicates that an elevation associated with at least one relative terrain data element of said second plurality of relative terrain data elements is greater than or equal to a predefined elevation associated with said current altitude of said airborne vehicle, generating a first plurality of non-color coded visual display control signals associated with said first plurality of absolute terrain data elements, the first plurality of non-color coded visual display control signals removing all colors or hues in a visual display of said first plurality of absolute terrain data elements, and generating a second plurality of color coded visual display control signals associated with said at least one relative terrain data element.

10. The method of claim 9, further comprising the step of:
generating a first plurality of color coded visual display control signals associated with said first plurality of absolute terrain data elements, if said result of said comparison step indicates that said elevation associated with said at least one relative terrain data element of said second plurality of relative terrain data elements is less than said predefined elevation associated with said current altitude of said airborne vehicle.

11. The method of claim 9, further comprising the step of:
displaying a visual representation of said first plurality of non-color coded visual display control signals associated with said first plurality of absolute terrain data elements and said second plurality of color coded visual display control signals associated with said at least one relative terrain data element.

12. The method of claim 9, wherein said second plurality of color coded visual display control signals includes at least one color signal representing a color of green, yellow or red.

13. The method of claim 9, wherein said first plurality of non-color coded visual display control signals includes at least one signal representing a grayscale.

14. The method of claim 9, wherein the determining step is performed by an aircraft altitude sensor.

15. The method of claim 9, wherein the retrieving step is performed on a terrain database.

16. A computer program product, comprising:
a computer-usable medium having computer-readable code embodied therein for configuring a computer processor, the computer program product comprising:
a first executable computer-readable code configured to cause the computer processor to determine a current altitude of an airborne vehicle;
a second executable computer-readable code configured to cause the computer processor to retrieve a first plurality of absolute terrain data elements and a second plurality of relative terrain data elements;
a third executable computer-readable code configured to cause the computer processor to compare said current altitude of said airborne vehicle with said second plurality of relative terrain data elements; and
a fourth executable computer-readable code configured to cause the computer processor to generate a first plurality of non-color coded visual display control signals associated with said first plurality of absolute terrain data elements such that the first plurality of non-color coded visual display control signals removes all colors or hues in a visual display of said first plurality of absolute terrain data elements, and generate a second plurality of color coded visual display control signals associated with said at least one relative terrain data element, if a result of the compare operation indicates that an elevation associated with at least one relative terrain data element of said second plurality of relative terrain data elements is greater than or equal to a predefined elevation associated with said current altitude of said airborne vehicle.

17. The computer program product of claim 16, further comprising:
a fifth executable computer-readable code configured to cause the computer processor to generate a first plurality of color coded visual display control signals associated with said first plurality of absolute terrain data elements, if said result of the compare operation indicates that said elevation associated with said at least one relative terrain data element of said second plurality of relative terrain data elements is less than said predefined elevation associated with said current altitude of said airborne vehicle.

18. The computer program product of claim 16, further comprising:
a sixth executable computer-readable code configured to cause the computer processor to display a visual representation of said first plurality of non-color coded visual display control signals associated with said first plurality of absolute terrain data elements and said second plurality of color coded visual display control signals associated with said at least one relative terrain data element.

19. The computer program product of claim 16, wherein said second plurality of color coded visual display control signals includes at least one color signal representing a color of green, yellow or red.

20. The computer program product of claim 16, wherein said computer processor comprises a microprocessor.

* * * * *